US012570127B2

(12) United States Patent　　　　(10) Patent No.:　US 12,570,127 B2

Newcomb et al.　　　　　　　　　　　(45) Date of Patent:　　Mar. 10, 2026

(54) TEMPERATURE COMPENSATED, FIBER REINFORCED, STRUCTURAL COMPOSITE ROOF

(71) Applicant: GM GLOBAL TECHNOLOGY OPERATIONS LLC, Detroit, MI (US)

(72) Inventors: Bradley Allen Newcomb, Troy, MI (US); Xiaosong Huang, Novi, MI (US); Julien P. Mourou, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1081 days.

(21) Appl. No.: 17/584,557

(22) Filed: Jan. 26, 2022

(65) Prior Publication Data

US 2023/0234423 A1　　　Jul. 27, 2023

(51) Int. Cl.
| | |
|---|---|
| B60H 1/22 | (2006.01) |
| B32B 3/12 | (2006.01) |
| B32B 5/02 | (2006.01) |
| B32B 5/26 | (2006.01) |
| B32B 7/12 | (2006.01) |

(Continued)

(52) U.S. Cl.
CPC ............. B60H 1/2227 (2019.05); B32B 3/12 (2013.01); B32B 5/02 (2013.01); B32B 5/26 (2013.01); B32B 7/12 (2013.01); B60R 16/033 (2013.01); B62D 25/06 (2013.01); H05B 3/14 (2013.01); H05B 3/286 (2013.01); B32B 2262/0269 (2013.01); B32B 2262/101 (2013.01); B32B 2262/105 (2013.01); B32B 2262/106 (2013.01); B32B 2307/206

(2013.01); B32B 2605/08 (2013.01); H05B 2203/016 (2013.01); H05B 2214/04 (2013.01)

(58) Field of Classification Search
CPC ........... B60H 1/2227; B32B 3/12; B32B 5/02; B32B 5/26; B32B 7/12; B32B 2262/0269; B32B 2262/101; B32B 2262/105; B32B 2262/106; B32B 2307/206; B32B 2605/08; B60R 16/033; B62D 25/06; H05B 3/14; H05B 3/286; H05B 2203/016; H05B 2214/04
USPC .......................................................... 219/202
See application file for complete search history.

(56) References Cited

U.S. PATENT DOCUMENTS

| | | | |
|---|---|---|---|
| 2019/0270259 A1* | 9/2019 | Gans ....................... | B32B 27/12 |
| 2019/0322375 A1* | 10/2019 | Hardman .............. | B29C 70/882 |

(Continued)

OTHER PUBLICATIONS

U.S. Appl. No. 17/141,478, filed Jan. 5, 2021, Newcomb et al.

(Continued)

*Primary Examiner* — Elizabeth M Kerr
*Assistant Examiner* — Simpson A Chen

(57) ABSTRACT

A composite roof panel of a vehicle disposed vertically above a passenger cabin of the vehicle includes: a first one or more layers of carbon fiber; a second one or more layers of carbon fiber; a binder material configured to bind the first and second one or more layers of carbon fiber; first and second electrical conductors that are: disposed between the first one or more layers of carbon fiber and the second one or more layers of carbon fiber; configured to be selectively electrically connected to a battery of the vehicle; and electrically connected to at least one of the first and second one or more layers of carbon fiber.

13 Claims, 10 Drawing Sheets

(51) Int. Cl.

| | |
|---|---|
| B60R 16/033 | (2006.01) |
| B62D 25/06 | (2006.01) |
| H05B 3/14 | (2006.01) |
| H05B 3/28 | (2006.01) |

(56) References Cited

U.S. PATENT DOCUMENTS

| | | | | |
|---|---|---|---|---|
| 2020/0386159 | A1* | 12/2020 | Mizuno | ................. F04D 29/023 |
| 2022/0272795 | A1* | 8/2022 | Lim | ......................... H05B 3/84 |
| 2022/0288997 | A1* | 9/2022 | Krier | ....................... F24D 13/02 |

OTHER PUBLICATIONS

U.S. Appl. No. 17/141,524, filed Jan. 5, 2021, Newcomb et al.
U.S. Appl. No. 17/152,965, filed Jan. 20, 2021, Newcomb et al.
U.S. Appl. No. 17/406,024, filed Aug. 18, 2021, Newcomb et al.

* cited by examiner

104

104

TEMPERATURE COMPENSATED, FIBER REINFORCED, STRUCTURAL COMPOSITE ROOF

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to roofs of vehicles and more particularly to fiber reinforced vehicle roofs including one or more heaters.

Vehicles include a passenger cabin. Passengers sit within the passenger cabin. Vehicles include one or more rows of seats upon which passengers sit within the passenger cabin.

A roof panel is disposed vertically above the passenger cabin. A front windshield closes a front opening of the vehicle. A rear windshield closes a rear opening of the vehicle.

SUMMARY

In a feature, a composite roof panel of a vehicle disposed vertically above a passenger cabin of the vehicle includes: a first one or more layers of carbon fiber; a second one or more layers of carbon fiber; a binder material configured to bind the first and second one or more layers of carbon fiber; first and second electrical conductors that are: disposed between the first one or more layers of carbon fiber and the second one or more layers of carbon fiber; configured to be selectively electrically connected to a battery of the vehicle; and electrically connected to at least one of the first and second one or more layers of carbon fiber.

In further features, a switch is configured to selectively connect and disconnect one of the first and second electrical conductors to and from the battery.

In further features, a temperature control module is configured to actuate the switch and connect the one of the first and second electrical conductors to the battery in response to receipt of an input to heat the passenger cabin of the vehicle.

In further features, a temperature control module is configured to actuate the switch and connect the one of the first and second electrical conductors to the battery in response to receipt of an input to melt at least one of ice and snow on the roof panel.

In further features, the first and second electrical conductors include planer sheets of electrically conductive material.

In further features, the electrically conductive material is one of carbon fibers, indium tin oxide (ITO), graphene, silver wires, carbon nanotubes (CNT), copper, and aluminum.

In further features, the first and second electrical conductors extend laterally across the vehicle.

In further features, third and fourth electrical conductors are: disposed between the first one or more layers of carbon fiber and the second one or more layers of carbon fiber; configured to be selectively electrically connected to the battery of the vehicle; and electrically connected to at least one of the first and second one or more layers of carbon fiber.

In further features the roof panel further includes: a third one or more layers of carbon fiber; a fourth one or more layers of carbon fiber; third and fourth electrical conductors that are: disposed between the third one or more layers of carbon fiber and the fourth one or more layers of carbon fiber; configured to be selectively electrically connected to the battery of the vehicle; and electrically connected to at least one of the third and fourth one or more layers of carbon fiber.

In further features, the roof panel further includes: a first switch configured to selectively connect and disconnect one of the first and second electrical conductors to and from the battery; and a second switch configured to selectively connect and disconnect one of the third and fourth electrical conductors to and from the battery.

In further features, a temperature control module is configured to: actuate the first switch and connect the one of the first and second electrical conductors to the battery in response to receipt of an input to heat the passenger cabin of the vehicle; and actuate the second switch and connect the one of the third and fourth electrical conductors to the battery in response to receipt of an input to melt at least one of ice and snow on the roof panel.

In further features, an electrical insulator layer is disposed between (a) the first and second one or more layers of carbon fiber and (b) the third and fourth one or more layers of carbon fiber.

In further features, the electrical insulator layer includes at least one of glass, basalt, Kevlar, a polymeric fiber, and a natural fiber.

In further features, the first one or more layers of carbon fiber, the second one or more layers of carbon fiber, and the first and second electrical conductors are disposed vertically above a passenger seat within the passenger cabin.

In further features, the roof panel includes a heater layer of electrically conductive material, the heater layer disposed between the first one or more layers of carbon fiber and the second one or more layers of carbon fiber and in direct contact with the first and second electrical conductors.

In further features, the electrically conductive material includes one of indium tin oxide, graphene, carbon nanotubes, and silver nanowires.

In further features, the roof panel includes electrically conductive paste disposed between the first one or more layers of carbon fiber and the second one or more layers of carbon fiber and configured to: electrically connect the first electrical conductor to at least one of the first and second one or more layers of carbon fiber; and electrically connect the second electrical conductor to the at least one of the first and second one or more layers of carbon fiber.

In further features, the binder material is one of transparent and translucent and is one of a thermoset and a thermoplastic material.

In a feature, a roof panel of a vehicle disposed vertically above a passenger cabin of the vehicle includes: a first one or more layers of a material that is one of transparent and opaque; a second one or more layers of the material; a first electrical conductor that is disposed between the first one or more layers and the second one or more layers, that includes apertures through the first electrical conductor, and that is configured to be selectively electrically connected to a battery of the vehicle; and third and fourth electrical conductors that are: disposed between the first one or more layers and the second one or more layers; and electrically connected to the first electrical conductor.

In a feature, a method includes: receiving input to heat a composite roof panel of a vehicle; and in response to the input, applying power to first and second electrical conductors of the roof panel from a battery of the vehicle, the roof panel including: a first one or more layers of carbon fiber; a second one or more layers of carbon fiber; a binder material configured to bind the first and second one or more layers of carbon fiber; and the first and second electrical conductors that are: disposed between the first one or more layers of carbon fiber and the second one or more layers of carbon fiber; configured to be selectively electrically connected to the battery of the vehicle; and electrically connected to at least one of the first and second one or more layers of carbon fiber.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle includes a roof panel that is disposed vertically above a passenger cabin of the vehicle. Seats of the vehicle are disposed within the passenger cabin. The roof panel may include, for example, carbon fiber material.

Carbon fiber is electrically and thermally conductive. The present application involves a roof panel that includes one or more heaters. For example, one heater may be disposed vertically above each passenger seat of the vehicle. Each heater may include one or more layers of carbon fiber and first and second electrical conductors that are electrically connected to the one or more layers of carbon fiber. The heater(s) may be turned on, for example, to melt snow and/or ice on an outer surface of the roof panel, to warm the passenger cabin, and/or under one or more other circumstances.

Figure 1:
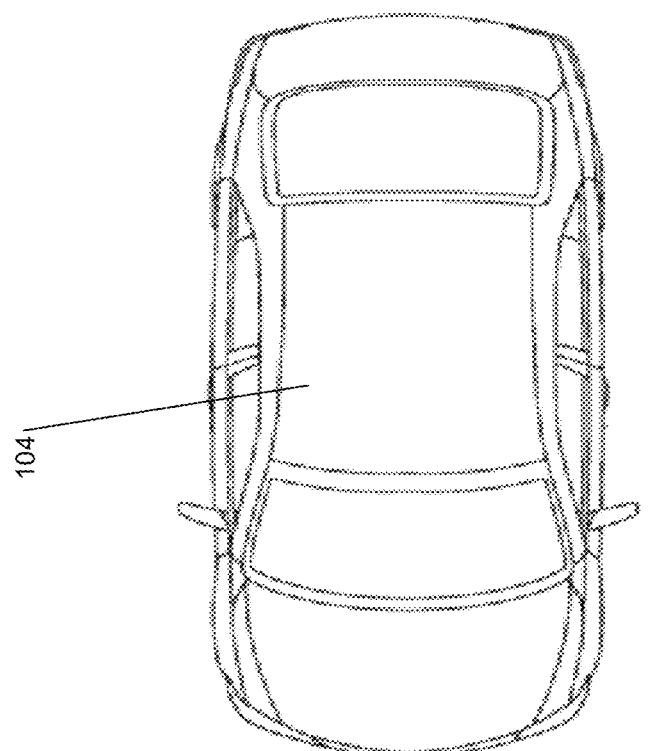
FIG. 1 includes a top view of an example vehicle.
Figure 1:

FIG. 1 is a top view of an example vehicle. The vehicle includes a roof panel 104 that is vertically above a passenger cabin of the vehicle. One or more passenger seats are disposed within the passenger cabin. For example, a front row of two passenger seats and a rear row of two passenger seats may be arranged within the passenger cabin. While the example of two rows of two passenger seats is provided, the present application is also applicable to other arrangements and numbers of passenger seats. While an example vehicle is shown, the present application is also applicable to other types of vehicles. The present application is applicable to internal combustion vehicles, hybrid vehicles including an internal combustion engine and one or more electric motors, and electric vehicles including one or more electric motors and fuel cell vehicles. The present application is applicable to non-autonomous (human driven) vehicles, semi-autonomous vehicles, and autonomous vehicles.

Figure 2:
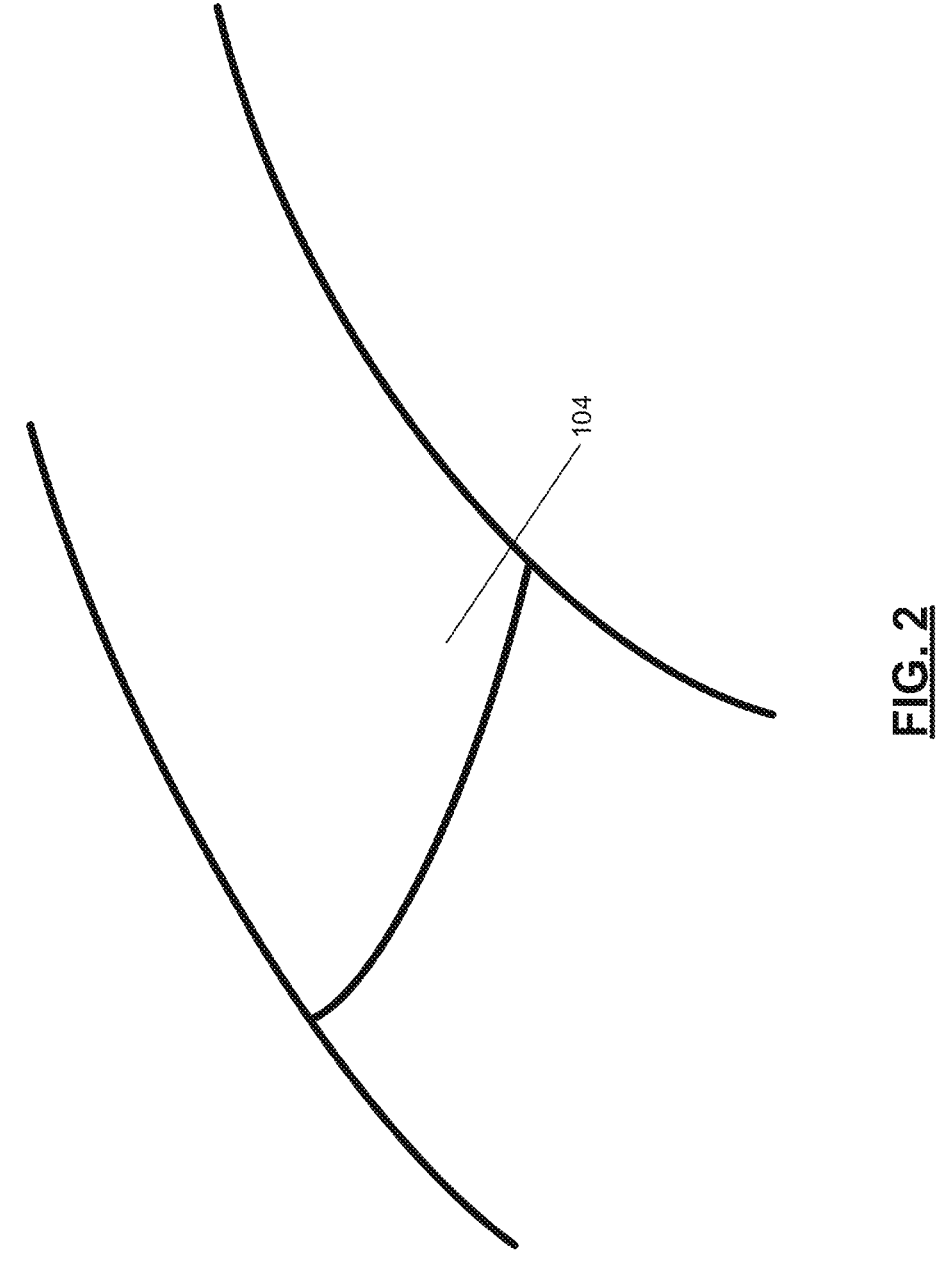
FIGS. 2-4 include a perspective view of an example of a roof panel.

FIG. 2 includes a perspective view of an example of the roof panel 104. The roof panel 104 may be structural or non-structural. The roof panel 104 includes one or more composite portions, such as including carbon fiber. The roof panel 104 may be transparent, translucent, or opaque. In various implementations, the roof panel 104 may include one or more discreet translucent and/or transparent portions and one or more opaque portions.

As discussed further below, the roof panel 104 includes one or more heaters. The heater(s) can be used, for example, to melt snow and/or ice on top of the roof panel 104, to warm the passenger cabin of the vehicle, and/or for one or more other reasons. The heater(s) include carbon fiber that is used to generate heat when power is applied to the carbon fiber.

Figure 3:
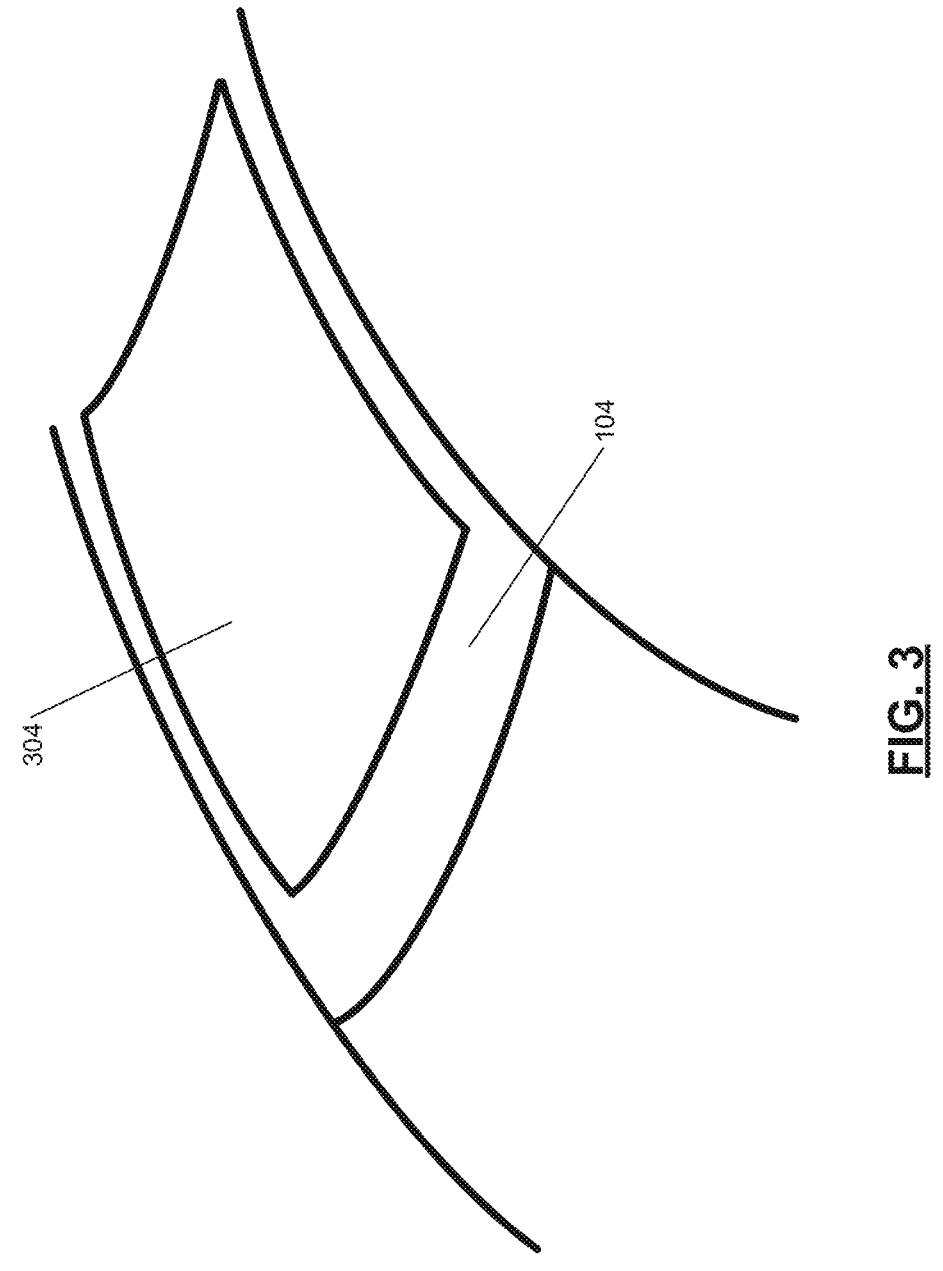
Figure 4:
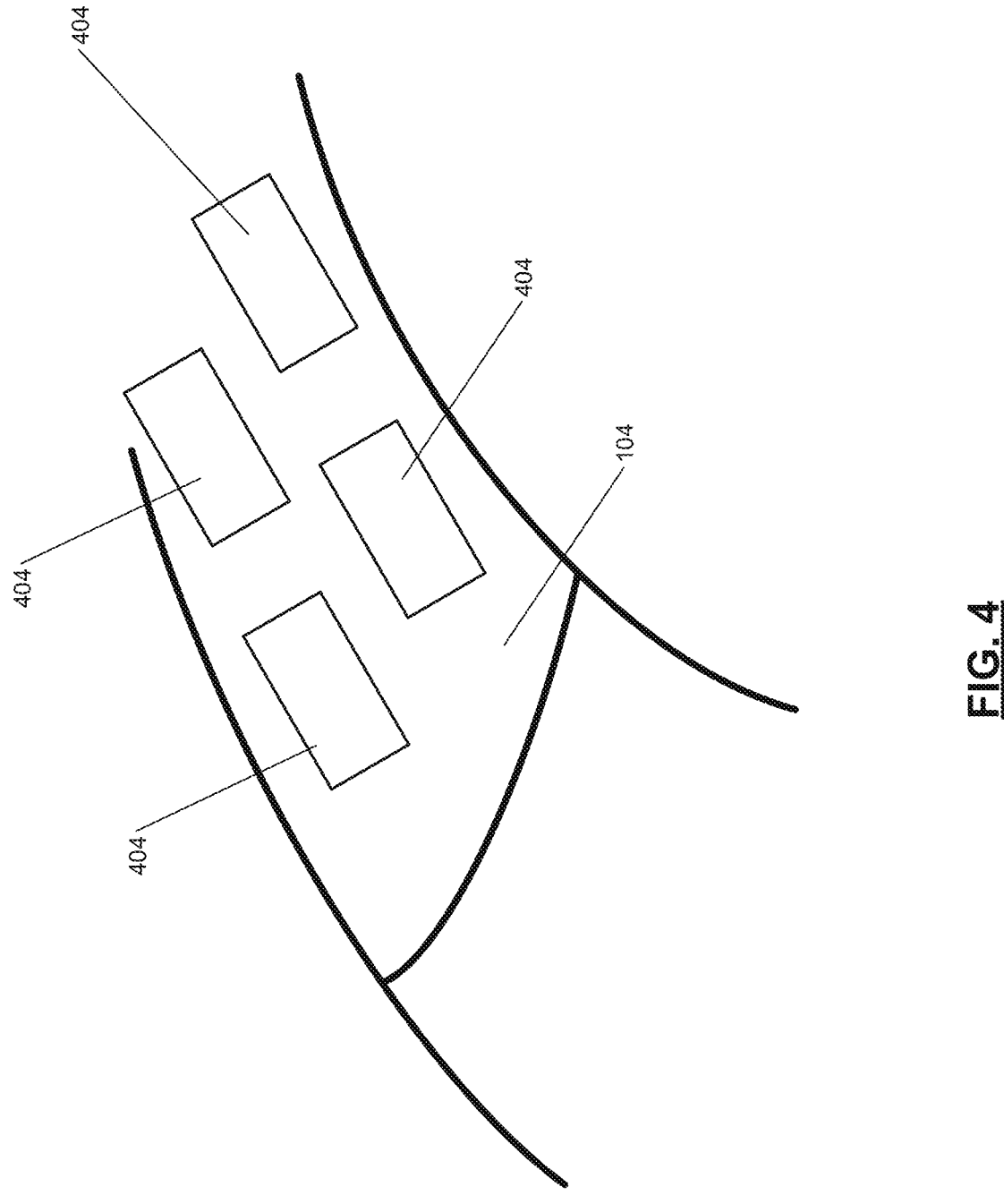

FIGS. 3 and 4 are also perspective views of examples of the roof panel 104. As illustrated in FIG. 3, the roof panel 104 may include one heater 304, such as formed over a majority of the area of the roof panel 104. As illustrated in FIG. 4, the roof panel 104 may include multiple heaters 404. For example, four seats may be disposed within the passenger cabin, and the heaters 404 may be disposed vertically above the seats, respectively.

Figure 5:
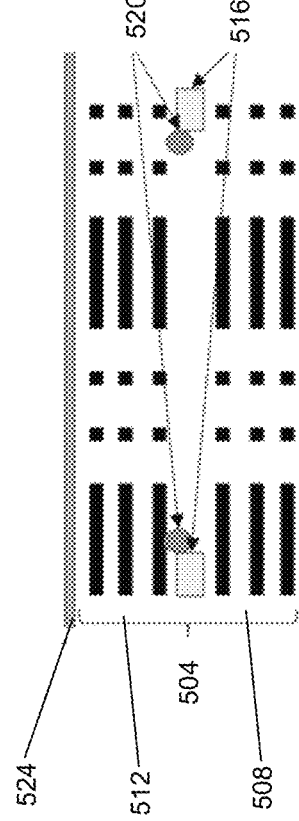
FIGS. 5-7 are cross-sectional views of example heaters of the roof panel.
Figure 5:

FIG. 5 is a cross-sectional view of an example implementation of a heater 504 (e.g., 304 or 404) of the roof panel 104. In the example of the roof panel 104 including multiple heaters, each of the heaters may be identical.

The heater 504 includes a first one or more layers of carbon fiber 508 and a second one or more layers of carbon fiber 512. The first one or more layers of carbon fiber 508 may include carbon fiber arranged in different directions. The second one or more layers of carbon fiber 512 may include carbon fiber arranged in different directions. The first and second one or more layers of carbon fiber 508 and 512 are portions of the roof panel 104 and extend outwardly past the heater 504. As such, carbon fiber of the roof panel 104 is used as the heater 504.

The heater 504 includes first and second electrical conductors 516. The first and second electrical conductors 516 may be located more toward a front of the vehicle and more toward a rear of the vehicle, respectively. The first and second electrical conductors 516 include an electrically conductive material, such as copper, aluminum, indium tin oxide, or another suitable electrical conductor. The first and second electrical conductors 516 may include a tape, a film, or have another suitable form. In various implementations, the heater 504 may include multiple first electrical conductors and/or multiple second electrical conductors, such as to create a wider lateral (left to right relative to forward and backward directions of the vehicle) heating area. In various implementations, the first and second electrical conductors 516 may extend laterally, such as to create a wider lateral heating area.

The heater 504 may also include electrically conductive paste 520. The electrically conductive paste 520 electrically connects the first and second electrical conductors 516 with one or both of the first and second one or more layers of carbon fiber 508 and 512. Carbon fiber is electrically and thermally conducting. When a voltage is applied across the first and second electrical conductors 516, carbon fiber generates heat (resistively via Joule heating). The first and second one or more layers of carbon fiber 508 and 512 may be held together by a thermoset, a thermoplastic material, or another suitable binder. The matrix binder material may be transparent, semi-transparent, or opaque.

In various implementations, the roof panel 104 may include one or more protective layers 524 disposed outwardly from the heater 504. The protective layer(s) 524 may include, for example, an infrared (IR) reflector, a styling (e.g., chrome) layer, an aluminum foil layer, a multilayered film, a silicone hard coat, and/or one or more other protective layers or hard coats.

Figure 6:
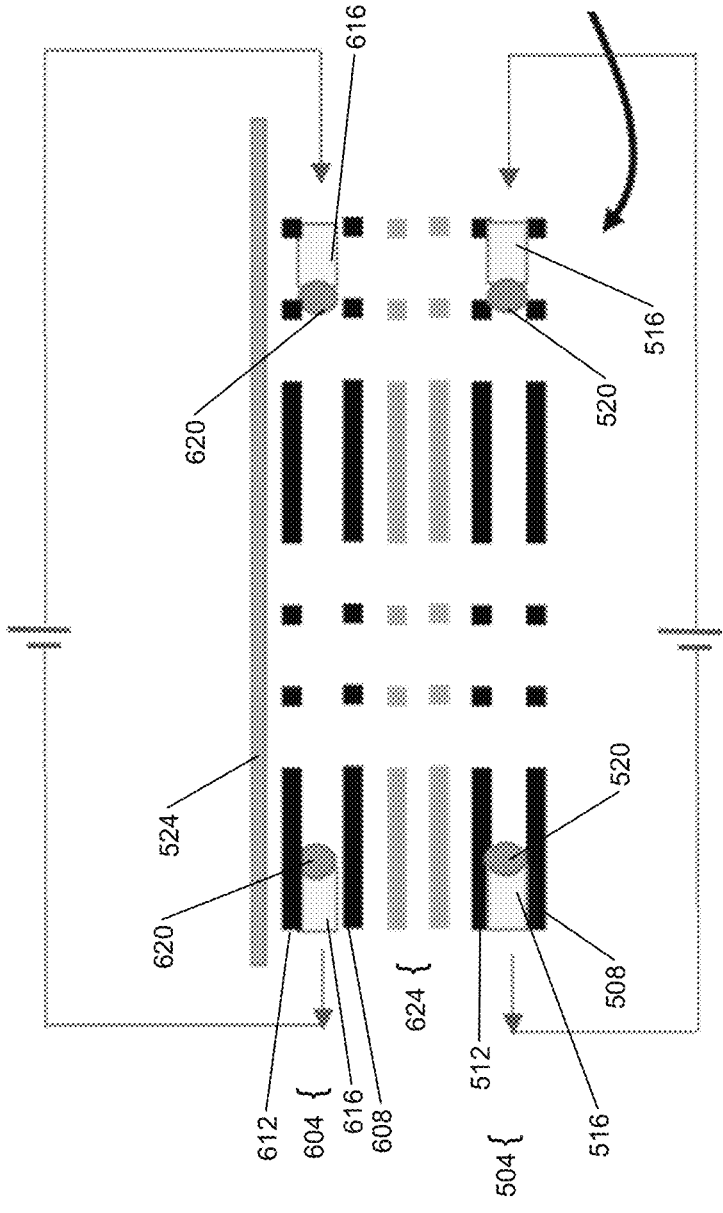

FIG. 6 is a cross-sectional view of an example implementation of heaters (e.g., 304 or 404) of the roof panel 104. In various implementations, the roof panel 104 may include the heater 504 and a second heater 604. The second heater 604 is disposed outwardly and vertically above the heater 504.

The second heater 604 includes a first one or more layers of carbon fiber 608 and a second one or more layers of carbon fiber 612. The first one or more layers of carbon fiber 608 may include carbon fiber arranged in different directions. The second one or more layers of carbon fiber 612 may include carbon fiber arranged in different directions. The first and second one or more layers of carbon fiber 608 and 612 are portions of the roof panel 104 and extend outwardly past the second heater 604. As such, carbon fiber of the roof panel 104 is used as the second heater 604. In various implementations, the first one or more layers of carbon fiber 608 or the second one or more layers of carbon fiber 612 may be omitted as a single one or more layers of carbon fiber may provide heating.

The second heater 604 includes first and second electrical conductors 616. The first and second electrical conductors 616 may be located more toward a front of the vehicle and more toward a rear of the vehicle, respectively. The first and second electrical conductors 616 include an electrically conductive material, such as copper, aluminum, indium tin oxide, or another suitable electrical conductor. The first and second electrical conductors 616 may include a tape, a film, or have another suitable form. In various implementations, the second heater 604 may include multiple first electrical conductors and/or multiple second electrical conductors, such as to create a wider lateral (left to right relative to forward and backward directions of the vehicle) heating area. In various implementations, the first and second electrical conductors 616 may extend laterally, such as to create a wider lateral heating area.

The second heater 604 may also include electrically conductive paste 620. The electrically conductive paste 620 may be applied to dry carbon fiber layer(s) prior to the infusion/consolidation with the resin matrix material. The electrically conductive paste 620 electrically connects the first and second electrical conductors 616 with one or both of the first and second one or more layers of carbon fiber 608 and 612. When a voltage is applied across the first and second electrical conductors 616, carbon fiber generates heat (resistively via Joule heating). The first and second one or more layers of carbon fiber 608 and 612 may be held together by a thermoset, a thermoplastic material, or another suitable material. The matrix binder material may be transparent, semi-transparent, or opaque.

One or more electrically insulative (isolative) layers 624 are disposed between the heater 504 and the second heater 604. The electrically insulative layer(s) 624 electrically insulate the heater 504 from the second heater 604. As such, the heater 504 and the second heater 604 are individually controllable. For example, the heater 504 may be turned on, for example, in response to a request to heat the passenger cabin or a seat within the passenger cabin. The second heater 604 may be turned on, for example, in response to a request to de-ice/de-snow the roof panel 104. The electrically insulative layer(s) 624 may include, for example, glass fibers, hollow glass microspheres, basalt fibers, natural fibers, Kevlar fibers, polyethylene fibers, or another electrically insulative/isolative material.

Figure 7:
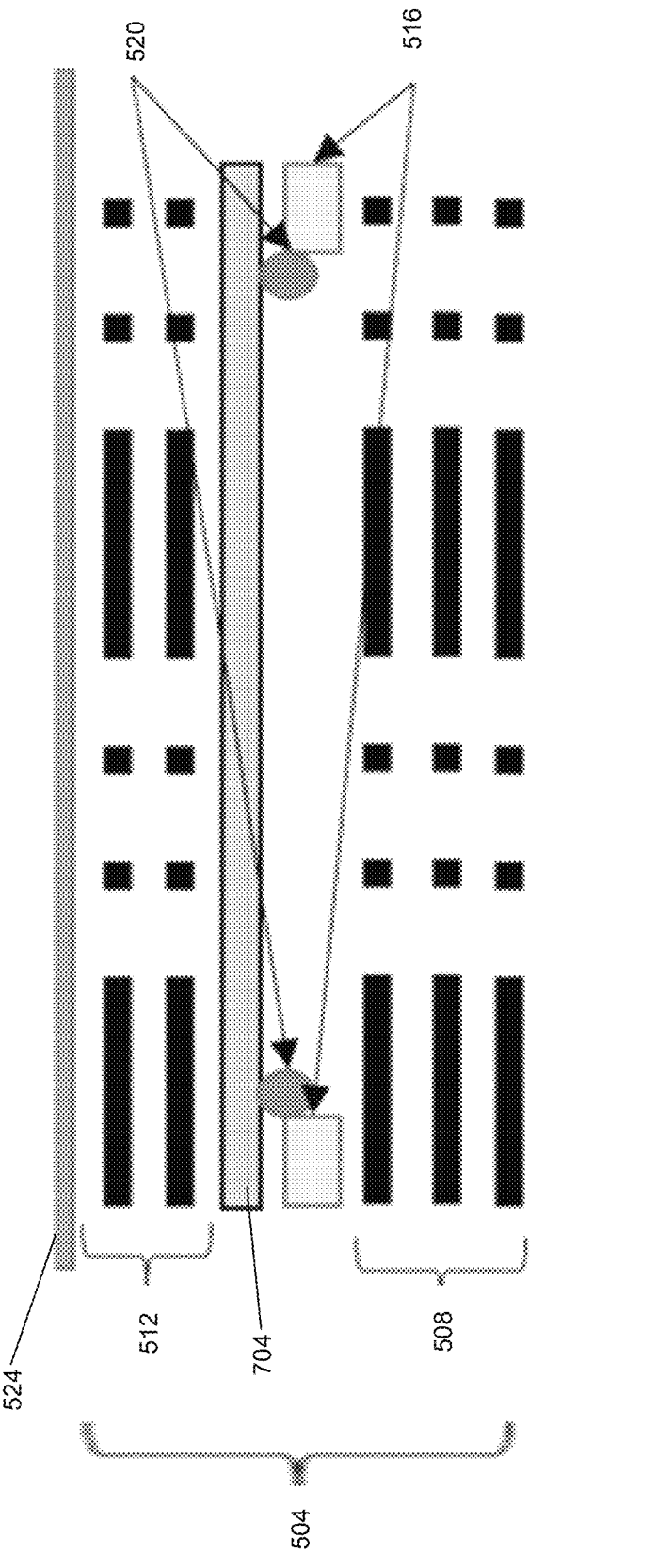

FIG. 7 is a cross-sectional view of an example implementation of the heater 504 (e.g., 304 or 404) of the roof panel 104. In the example of FIG. 7, the first and second one or more layers 508 and 512 may include one or more structural fiber materials, such as carbon fiber, glass fiber, basalt fiber, Kevlar fiber, natural fiber, or another suitable type of material. The first and second one or more layers 508 and 512 may be, for example, a single fibrous material, or one or more different layers, or a mixed fiber weave.

The heater 504 also includes one or more electrically conductive layers 704. The electrically conductive layer(s) 704 include electrically conductive material, such as indium tin oxide, graphene, carbon nanotube (CNT), silver nanowire, or another suitable electrically conductive material. The first and second electrical conductors 516 may directly contact the electrically conductive layer(s) 704 or indirectly via the electrically conductive paste 520. In various implementations, the electrically conductive paste 520 may be omitted. The first and second electrical conductors 516 and the electrically conductive paste 520 may also be omitted if the electrically conductive layer(s) 704 extend outwardly and can be connected to directly.

Figure 8:
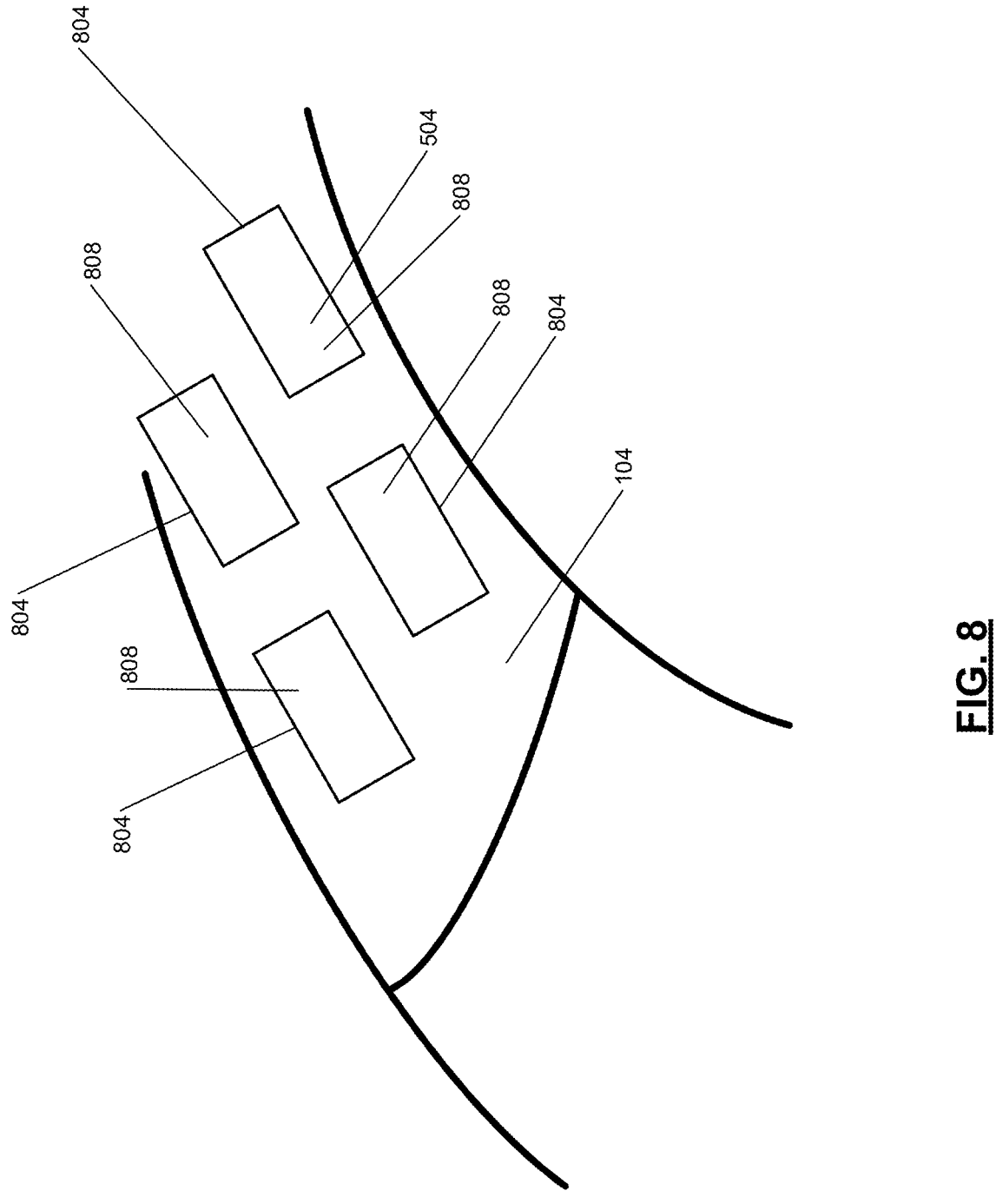
FIG. 8 includes a perspective view of an example of a roof panel.

FIG. 8 is a perspective view of an example implementation of the roof panel 104. As stated above, the roof panel 104 includes one or more composites, such as carbon fiber. The roof panel 104 may be locally (in one or more predetermined areas) transparent, translucent, or opaque or globally transparent, translucent, or opaque.

The roof panel 104 may include one or more apertures 804 through the roof panel 104. For example, the apertures 804 may be disposed vertically above seats, respectively, within the passenger cabin. While the example of four apertures is provided, the present application is also applicable to other numbers of apertures and/or seats.

Figure 9:
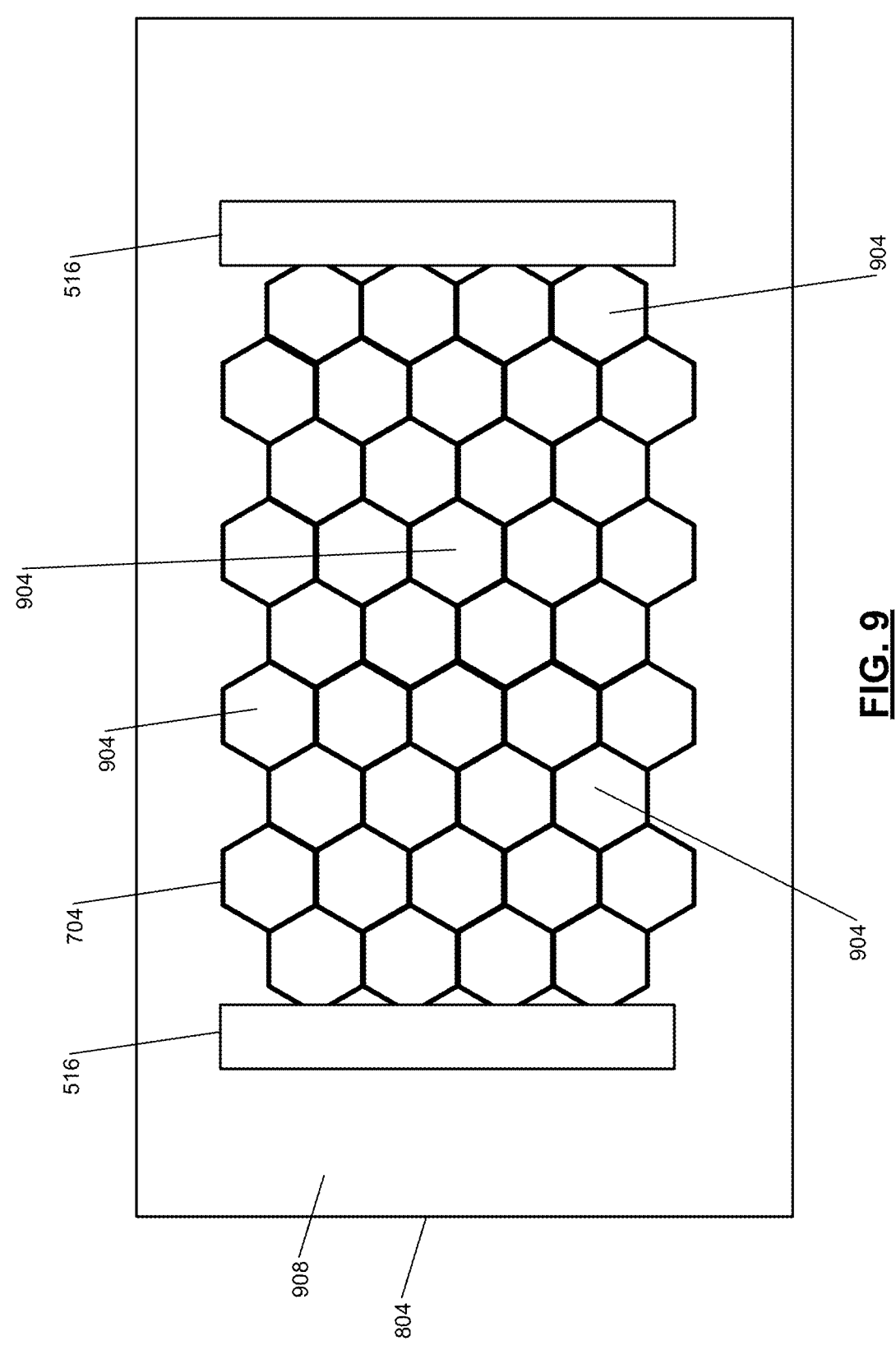
FIG. 9 is an example perspective view of a heaters of a roof panel.

Heaters 808 (e.g., the heaters of FIG. 5, 6, or 7) are arranged within the apertures 804, respectively. For example, FIG. 9 is an example perspective view of one of the heaters 808. The heater 808 may include one or more first electrical conductors 516 and one or more second conductors 516. The electrically conductive layer(s) 704 is electrically connected to the first and second electrical conductors 516.

The electrically conductive layer(s) 704 may be referred to as a heating element. The electrically conductive layer(s) 704 includes one or more apertures, such as apertures 904. While the example of hexagonal apertures is provided, the present application is also applicable to apertures of other shapes.

In the example of FIG. 9, the heater 808 is disposed within a transparent or translucent structural material 908, such as polycarbonate or another suitable material. The transparent or translucent structural material 908 and the apertures 904 may provide visibility through at least apertures through the roof panel 104. In various implementations, the remainder of the roof panel 104 may be made of the same transparent or translucent structural material 908 to maximize visibility through the roof panel 104.

Figure 10:
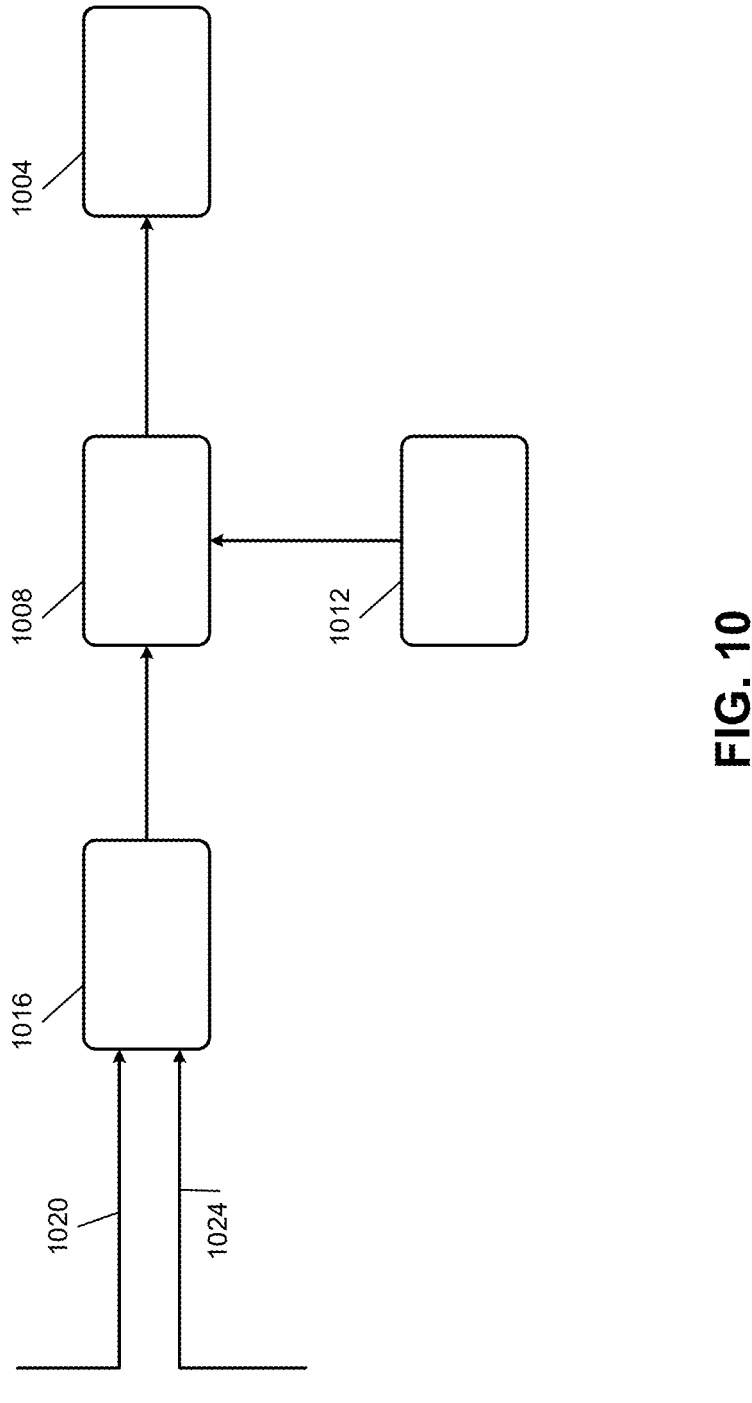
FIG. 10 is a functional block diagram of an example heater control system.

FIG. 10 is a functional block diagram of an example heater control system. A heater 1004 in a roof panel of a vehicle generates heat when power is applied to the heater 1004. The heater 1004 may be one of the heaters discussed above.

One or more switches, such as switch 1008, are actuatable to connect and disconnect the heater 1004 to and from a battery 1012 of the vehicle. A heater control module 1016 controls actuation of the switch(es) and therefore controls whether or not power is applied to the heater 1004. In various implementations, the heater control module 1016 may vary the power applied to the heater 1004.

For example only, the heater control module 1016 may turn on the heater 1004 (e.g., 304 or 604) via closing the switch 1008 in response to receipt of a melt request 1020 for the roof panel 1004. The melt request 1020 may be received from a user input device in response to user actuation. As another example, the heater control module 1016 may turn on the heater 1004 (e.g., 304 or 504) in response to receipt of a passenger cabin heat request 1024. The passenger cabin heat request 1024 may be received from a user input device in response to user actuation. If the passenger cabin heat request 1024 is for a specific seat, the heater control module 1016 may turn on the heater 1004 that is vertically above that seat.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A composite roof panel of a vehicle disposed vertically above a passenger cabin of the vehicle, the roof panel comprising:

a first one or more layers of carbon fiber, wherein the first one or more layers of carbon fiber include two or more layers of carbon fiber with fibers oriented in different directions;

a second one or more layers of carbon fiber, wherein the second one or more layers of carbon fiber include two or more layers of carbon fiber with fibers oriented in different directions;

a binder material configured to bind the first and second one or more layers of carbon fiber;

first and second electrical conductors that are:

disposed between the first one or more layers of carbon fiber and the second one or more layers of carbon fiber;

configured to be selectively electrically connected to a battery of the vehicle; and electrically connected to at least one of the first and second one or more layers of carbon fiber;

a third one or more layers of carbon fiber disposed vertically above the first and second one or more layers;

a fourth one or more layers of carbon fiber disposed vertically above the first and second one or more layers;

third and fourth electrical conductors that are:

disposed between the third one or more layers of carbon fiber and the fourth one or more layers of carbon fiber;

configured to be selectively electrically connected to the battery of the vehicle; and electrically connected to at least one of the third and fourth one or more layers of carbon fiber;

a first switch configured to selectively connect and disconnect one of the first and second electrical conductors to and from the battery;

a second switch configured to selectively connect and disconnect one of the third and fourth electrical conductors to and from the battery; and a temperature control module configured to:

actuate the first switch and connect the one of the first and second electrical conductors to the battery in response to receipt of an input to heat the passenger cabin of the vehicle; and actuate the second switch and connect the one of the third and fourth electrical conductors to the battery in response to receipt of an input to melt at least one of ice and snow on the roof panel.

2. The roof panel of claim 1 wherein the first and second electrical conductors include planer sheets of electrically conductive material.

3. The roof panel of claim 1 wherein the electrically conductive material is one of carbon fibers, indium tin oxide (ITO), graphene, silver wires, carbon nanotubes (CNT), copper, and aluminum.

4. The roof panel of claim 1 wherein the first and second electrical conductors extend laterally across the vehicle.

5. The roof panel of claim 1 further comprising electrical insulator layers disposed between (a) the first and second one or more layers of carbon fiber and (b) the third and fourth one or more layers of carbon fiber.

6. The roof panel of claim 5 wherein the electrical insulator layers includes at least one of glass, basalt, Kevlar, a polymeric fiber, and a natural fiber.

7. The roof panel of claim 1 wherein the first one or more layers of carbon fiber, the second one or more layers of carbon fiber, and the first and second electrical conductors are disposed vertically above a passenger seat within the passenger cabin.

8. The roof panel of claim 1 further comprising a heater layer of electrically conductive material, the heater layer disposed between the first one or more layers of carbon fiber and the second one or more layers of carbon fiber and in direct contact with the first and second electrical conductors.

9. The roof panel of claim 8 wherein the electrically conductive material includes one of indium tin oxide, graphene, carbon nanotubes, and silver nanowires.

10. The roof panel of claim 1 further comprising electrically conductive paste disposed between the first one or more layers of carbon fiber and the second one or more layers of carbon fiber and configured to:

electrically connect the first electrical conductor to at least one of the first and second one or more layers of carbon fiber; and electrically connect the second electrical conductor to the at least one of the first and second one or more layers of carbon fiber.

11. The roof panel of claim 1 wherein the binder material is one of transparent and translucent and is one of a thermoset and a thermoplastic material.

12. A roof panel of a vehicle disposed vertically above a passenger cabin of the vehicle, the roof panel comprising:

a first one or more layers of a material that is one of transparent and opaque, wherein the first one or more layers of include two or more layers of the material with fibers oriented in different directions;

a second one or more layers of the material, wherein the second one or more layers include two or more layers of the material with fibers oriented in different directions;

a first electrical conductor that is disposed between the first one or more layers and the second one or more layers, that includes apertures through the first electrical conductor, and that is configured to be selectively electrically connected to a battery of the vehicle; and third and fourth electrical conductors that are:

disposed between the first one or more layers and the second one or more layers; and electrically connected to the first electrical conductor;

a third one or more layers of the material disposed vertically above the first and second one or more layers;

a fourth one or more layers of the material disposed vertically above the first and second one or more layers;

fifth and sixth electrical conductors that are:

disposed between the third one or more layers and the fourth one or more layers;

configured to be selectively electrically connected to the battery of the vehicle; and electrically connected to at least one of the third and fourth one or more layers of carbon fiber;

a first switch configured to selectively connect and disconnect the first electrical conductor to and from the battery;

a second switch configured to selectively connect and disconnect one of the third and fourth electrical conductors to and from the battery; and a temperature control module configured to:

actuate the first switch and connect the one of the first and second electrical conductors to the battery in response to receipt of an input to heat the passenger cabin of the vehicle; and actuate the second switch and connect the one of the fifth and sixth electrical conductors to the battery in response to receipt of an input to melt at least one of ice and snow on the roof panel.

13. A method, comprising:

receiving a first input to heat a composite roof panel of a vehicle; and in response to the first input, applying power to first and second electrical conductors of the roof panel from a battery of the vehicle, the roof panel comprising:

a first one or more layers of carbon fiber, wherein the first one or more layers of carbon fiber include two or more layers of carbon fiber with fibers oriented in different directions;

a second one or more layers of carbon fiber, wherein the second one or more layers of carbon fiber include two or more layers of carbon fiber with fibers oriented in different directions;

a binder material configured to bind the first and second one or more layers of carbon fiber; and the first and second electrical conductors that are:

disposed between the first one or more layers of carbon fiber and the second one or more layers of carbon fiber;

configured to be selectively electrically connected to the battery of the vehicle; and electrically connected to at least one of the first and second one or more layers of carbon fiber;

receiving a second input to melt at least one of ice and snow on the roof panel; and in response to the input, applying power to third and fourth electrical conductors of the roof panel from the battery of the vehicle, the roof panel further comprising:

a third one or more layers of carbon fiber disposed vertically above the first and second one or more layers;

a fourth one or more layers of carbon fiber disposed vertically above the first and second one or more layers;

the third and fourth electrical conductors that are:

disposed between the third one or more layers of carbon fiber and the fourth one or more layers of carbon fiber;

configured to be selectively electrically connected to the battery of the vehicle; and electrically connected to at least one of the third and fourth one or more layers of carbon fiber.

\* \* \* \* \*